Patented Nov. 28, 1939

2,181,426

UNITED STATES PATENT OFFICE 2,181,426

MATERIAL AND METHOD FOR THE TREATMENT OF RUBBER

Georg Goll and Ernst Helft, Berlin, Germany, assignors, by direct and mesne assignments, to Deutsche Hydrierwerke Aktiengesellschaft, Berlin-Charlottenburg, Germany, a corporation of Germany No Drawing. Application July 5, 1935, Serial No. 29,924. In Germany July 5, 1934

10 Claims. (Cl. 106—23)

This invention relates to the treatment of rubber and provides better methods for the working of the rubber and for the addition of other material thereto during the process of manufacture and prior to vulcanization and also provides an improved final product.

In the copending applications of Ernst Helft, Ser. No. 502,870 filed December 16, 1930, and Ser. No. 641,039 filed November 3, 1932, the addition to rubber or latex of higher molecular fatty alcohols containing from 6 to 18 carbon atoms to provide easier working of the rubber has been described.

It has now been found, however, that the process described in the said prior applications can be materially improved and certain disadvantages of the prior use of the higher molecular fatty alcohols in rubber can be overcome if instead of adding the alcohols themselves directly to the rubber, water emulsions of the same are formed and added at the appropriate time into the latex or rubber mixture.

The essential advantage resulting from the use of an emulsion of the higher molecular fatty alcohol comes probably from the combined efficiency of the higher molecular fatty alcohol (containing from 6 to 18 carbon atoms) and the water together. In using such fatty alcohol emulsions the greater plasticizing efficiency of the fatty alcohols during the process will be increased by the plasticizing effect of the water and the presence of the water improves the later working of the rubber.

With the use of water emulsions of the higher fatty alcohol the plasticizing effect takes place quicker, easier and without the disadvantages such as the formation of bubbles etc. as has been described often in the literature with reference to the use of water containing materials in the manufacture of rubber. The fatty alcohols in the form of their water emulsions apparently enable the water to penetrate and disperse into the rubber mixture and facilitate its adsorption or evaporation in further curing the rubber.

The use of such water emulsions of the higher fatty alcohols also facilitates the addition of such materials as carbon black, chalk, talc etc. which can by ordinary means be mixed into the rubber only with great difficulty and often enables one to reduce the amount of accelerator used by 25–30% and still get the same vulcanization effect. At the same time it does not make any difference on account of the double character of the emulsion whether the materials to be added to the rubber mixture are of a hydrophile or hydrophobe nature.

Another advantage in using such fatty alcohol emulsions is the economy in time and labor in working up the rubber or latex mixture and the improved final or vulcanized product resulting from the use thereof. Such fatty alcohol emulsions are suitable especially for use in the incorporation of textile fibres into the rubber.

It is easily possible to produce the emulsions in such a way that they can be stored for indefinite periods of time or shipped without distinction of the emulsion.

The following examples are illustrative of ways to practice our invention it being understood that the application of the invention is not limited to the specific examples herein given.

Example 1

In 20 kilos of previously masticated latex or caoutchouc 1 kilo of an emulsion of a higher alcohol is mixed, said emulsion consisting of 500 grams of stearic alcohol mixed with 500 grams of water by adding at the same time an emulsifying agent such as for example 20 grams of the sodium salt of a fatty acid or the salt of a sulfonated fatty alcohol or other known emulsifying agent while at a slightly elevated temperature. To this mixture the usual vulcanizing, accelerating and other agents are added and the mixture vulcanized in the usual manner.

Example 2

50 kilos of latex are masticated adding at the same time 2 kilos (more or less) of a fatty alcohol emulsion prepared in the same manner as above by mixing 800 grams each of stearic alcohol and oleyl alcohol with 1200 grams of water and using about 40 grams of a suitable emulsifying agent such as those mentioned above. To this mixture the usual vulcanizing, accelerating and other agents are added and the mixture vulcanized in the usual manner.

Example 3

To 25 parts by weight of carbon black add 2.25 parts by weight of an emulsion produced by mixing 40 parts by weight of a mixture of fatty alcohols, containing from 12 to 18 carbon atoms, with one part by weight of an emulsifying agent and 60 parts by weight of water. This mixture is added to 64 parts by weight of latex or caoutchouc which has been previously masticated and is kneaded into the rubber together with 5 parts by weight of zinc oxide (ZnO), 3 parts by weight of sulphur and 0.75 part by weight of diphenylguanidine. The mixture is then vulcanized in the usual manner.

*Example 4*

Into 90 parts by weight of previously masticated rubber 4.25 parts by weight of zinc oxide (ZnO) together with 2 parts by weight of the emulsion described in Example 3 are kneaded and 3 parts by weight of sulphur and 0.75 part of diphenylguanidine are added. The whole mixture is then vulcanized in the usual manner.

We have found, that by using an emulsion of the higher fatty alcohols as described above, it is possible to economize in the use of accelerators as much as 20–30%. For illustration in the last two mentioned examples the same acceleration has been arrived at with 0.75 part of diphenylguanidine as would be accomplished with 1.00 part of diphenylguanidine without the use of the higher fatty alcohol emulsion.

The application of the fatty alcohol emulsions can of course also be made in the presence of other materials which are to be added to the rubber as for instance materials which harden the rubber, anti-oxidizing agents, colouring material, etc., with the same good advantage.

While we have described an invention in detail and have set forth specific examples for its use, it will be understood from the nature of the invention that it is not confined to the specific examples given but extended to all higher fatty alcohol emulsions for use in rubber.

We claim:

1. As an article of manufacture, a rubber mixture comprising raw rubber and an emulsion of water and a higher molecular fatty alcohol containing from 12 to 18 carbon atoms in the molecule.

2. As an article of manufacture, a rubber mixture comprising raw rubber and an emulsion of water and a higher molecular fatty alcohol containing from 6 to 18 carbon atoms in the molecule.

3. The method of producing vulcanized rubber which comprises mixing rubber, pulverulent material and a plasticizer consisting of an emulsion containing about equal proportions of fatty alcohol having 6 to 18 carbon atoms in the molecule and water, said plasticizer constituting about 5% of the whole composition, and vulcanizing the same.

4. The method of producing vulcanized rubber which comprises mixing rubber, pulverulent material and a plasticizer consisting of an emulsion containing about equal proportions of fatty alcohol having 12 to 18 carbon atoms in the molecule and water, said plasticizer constituting about 5% of the whole composition, and vulcanizing the same.

5. The product of the process of claim 3.

6. The product of the process of claim 4.

7. As an article of manufacture, a rubber composition containing about 25% carbon black, about 2.5% fatty alcohol and about 2.5% water.

8. The method of producing vulcanized rubber which comprises first forming a plasticizing agent by emulsifying about equal parts of an alcohol having 6 to 18 carbon atoms in the molecule and water together with an emulsifying agent and then mixing rubber, pulverulent material and said plasticizer, said plasticizer constituting about 5% of the whole composition, and vulcanizing the same.

9. The method of producing vulcanized rubber which comprises first forming a plasticizing agent by emulsifying about equal parts of an alcohol having 6 to 18 carbon atoms in the molecule and water together with an emulsifying agent of the group consisting of soap and sulfonated fatty alcohol, and then mixing rubber, pulverulent material and said plasticizer, said plasticizer constituting about 5% of the whole composition, and vulcanizing the same.

10. The method of producing vulcanized rubber which comprises first forming a plasticizing agent by emulsifying about equal parts of an alcohol having 12 to 18 carbon atoms in the molecule and water together with an emulsifying agent and then mixing rubber, pulverulent material and said plasticizer, said plasticizer constituting about 5% of the whole composition, and vulcanizing the same.

GEORG GOLL.
ERNST HELFT.